(12) United States Patent
Jethwa et al.

(10) Patent No.: US 7,730,156 B1
(45) Date of Patent: Jun. 1, 2010

(54) METHOD AND SYSTEM FOR REPORTING CHANGES IN PIM DATA

(75) Inventors: Piyush Jethwa, Overland Park, KS (US); Farni B. Weaver, Spring Hill, KS (US); Arun Santharam, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2124 days.

(21) Appl. No.: 10/400,761

(22) Filed: Mar. 27, 2003

(51) Int. Cl.
*G06F 15/16* (2006.01)
(52) U.S. Cl. .................. 709/217; 709/201; 709/203; 709/218; 709/224
(58) Field of Classification Search ............. 709/245, 709/318, 203, 228, 206, 201, 217, 218, 224; 379/210.1; 345/700
See application file for complete search history.

(56) References Cited

U.S. PATENT DOCUMENTS

| 2002/0087740 | A1* | 7/2002 | Castanho et al. | 709/318 |
| 2002/0171673 | A1* | 11/2002 | Brown et al. | 345/700 |
| 2002/0196280 | A1* | 12/2002 | Bassett et al. | 345/751 |
| 2003/0206619 | A1* | 11/2003 | Curbow et al. | 379/210.01 |
| 2004/0121765 | A1* | 6/2004 | Idnani et al. | 455/422.1 |
| 2004/0122901 | A1* | 6/2004 | Sylvain | 709/206 |
| 2005/0021854 | A1* | 1/2005 | Bjorkner | 709/245 |

OTHER PUBLICATIONS

Columbia SIP User Agent, http://www.cs.columbia.edu/~xiaotaow/sipc/index.html, printed from the World Wide Web on Nov. 21, 2002.
Columbia SIP User Agent, User manual for sipc version 2.0, http://www.cs.columbia.edu/~xiaotaow/sipc/manual.html, printed from the World Wide Web on Nov. 21, 2002.
Microsoft Exchange Server: Presence Information, http://www.microsoft.com/exchange/evaluation/features/presenceinfo.asp, printed from the World Wide Web on Nov. 20, 2002.
Indigo Software, Indigo Presence Server & SDK™, http://www.indigosw.com/pdf/presence_server.pdf, printed from the World Wide Web in Nov. 2002.
Communication Outsourcing Magazine, $1^{st}$ Quarter 2002, Waiting for the Presence Revolution, http://www.tmcnet.com/co/0102/0102ess.htm, printed from the World Wide Web on Nov. 18, 2002.
dynamicsoft, "A Network Decomposition Model for Rapidly Developing Revenue-Generating Converged Services," White Paper, pp. 1-20, 2001.
Longboard, Fall 2000 Presence & Instant Messaging, "Evolution of Presence Based Networks," pp. 1-11, Jun. 25, 2001.
H. Sugano et al., "Common Presence and Instant Messaging (CPIM) Presence Information Data Format," Network Working Group, Internet-Draft, Oct. 2002.

(Continued)

*Primary Examiner*—Djenane M Bayard

(57) ABSTRACT

A method and system for reporting changes in personal information management (PIM) data. A user operating a client station subscribes to a presence server to be notified when a change in another user's PIM data occurs. The presence server responsively subscribes to a PIM host. When the designated change occurs, the PIM host notifies the presence server. The presence server then correlates the notification with the user's subscription and responsively notifies the user of the change.

31 Claims, 5 Drawing Sheets

OTHER PUBLICATIONS

J. Rosenberg et al., "An Extensible Markup Language (XML) Based Format for Watcher Information," Internet Engineering Task Force, Internet Draft, May 20, 2002.

J. Rosenberg et al., "Session Initiation Protocol (SIP) Extensions for Presence," Internet Engineering Task Force, Internet Draft, May 20, 2002.

J. Rosenberg et al., "A SIP Event Package for List Presence," Internet Engineering Task Force, Internet Draft, Jun. 24, 2002.

M. Day et al., "A Model for Presence and Instant Messaging," Network Working Group, Category: Informational, Feb. 2000.

D. Crocker et al., "Common Profile: Presence," IMPP WG, Internet Draft, Oct. 27, 2002.

J. Rosenberg et al., "Requirements for Manipulation of Data Elements in SIMPLE Systems," Internet Engineering Task Force, Internet Draft, Oct. 9, 2002.

Sprint, 2002 Sprint Application Developer's Conference, "SIP and SIMPLE: A Tutorial," http://www.dynamicsoft.com/news/presentations/SCD-2002_SIP_SIMPLE.pdf, printed from the World Wide Web in Nov. 2002.

Sprint, 2002 Sprint Application Developer's Conference, "Building Applications for wireless IP Networks,"http://www.dynamicsoft.com/news/presentations/SDC-2002_building_apps_wireless_ip.pdf, printed from the World Wide Web on Dec. 19, 2002.

dynamicsoft, "SIMPLE Presence and IM Update," http://www.dynamicsoft.com/news/presentations/PIM-2002_SIMPLE_update.pdf, printed from the World Wide Web on Dec. 19, 2002.

dynamicsoft, "Keep it SIMPLE: Leveraging SIP for Presence and IM," http://www.dynamicsoft.com/news/presentations/ITEL-2002_Keep_It_SIMPLE.pdf, printed from the World Wide Web in Nov. 2002.

dynamicsoft, "Industry Perspective," http:www/dynamicsoft.com/news/presentations/PIM-2002_Industry_Perspective.pdf, printed from the World Wide Web on Dec. 19, 2002.

Telematica Instituut, "Applications of presence," http://www.terena.nl/conferences/archive/tnc2000/eertink.ppt, printed from the World Wide Web in Nov. 2002.

\* cited by examiner

METHOD AND SYSTEM FOR REPORTING CHANGES IN PIM DATA

BACKGROUND

1. Field of the Invention

The present invention relates to telecommunications and, more particularly, to methods and systems for managing and sharing user personal information using presence.

2. Description of Related Art

A personal information manager, or "PIM", is a type of software application that is designed to provide users with personal, event, and group calendaring, along with task and contact management. A PIM application can be client-based (such as Microsoft Outlook, for instance) and/or server-based (such as Microsoft Exchange Server or WebEvent, for instance). Through a suitable client application, a user can interact with the PIM application to enter, modify and view information, such as calendar events and names, addresses and phone number of contacts.

At the same time, the telecommunications industry has recently embraced a concept known as "presence", according to which one network entity, such as a telecommunications user, can report a change in its status to another network entity. User status may encompass variety of information such as user physical location (e.g., at home, at the office, etc.), communications state (e.g., currently on the phone, able to accept a call, etc.), willingness to communicate (e.g., available, in a meeting, do not disturb, etc.) and a preferred communication mechanism (e.g., voice, email, video, etc.).

As defined by industry recommendations, presence is based on a system of subscriptions and notifications exchanged between two distinct sets of entities known as "watchers" and "presentities". By definition, watchers are entities that request presence information and presentities are entities that provide presence information. More particularly, a watcher can "subscribe" to a presentity to be notified when a change occurs with respect to the status of the presentity. And the presentity may then "notify" the watcher when a status change occurs.

Presence-based technology has been already successfully applied in instant messaging (IM) services to provide online/offline user status information. To illustrate, when a user logs into an IM system, an IM client (e.g., user agent client) on the user's terminal may alert some central server such as an IM/presence server that the user has signed on, by sending a registration message to the IM/presence server. In effect, in this arrangement, the user's IM client is functioning as a presentity, since the IM client is alerting the IM/presence server of a change of status at the user's client station.

Further, an IM client may subscribe to the IM/presence server, to be notified when other users sign onto the system (and are therefore available to receive instant messages). To do so, the IM client (as watcher) may send a subscription message to the IM/presence server, requesting to be notified when specified other users register with the server (for example, a user may maintain a buddy list which is a list of people a user wants to keep track of). In turn, when one of those specified other users (as presentity) registers with the server, the server may send a notification message to the subscribing IM client, indicating that the other user has signed onto the system.

While providing user online status is useful, a need for broader personal interaction among communications users still exists.

SUMMARY

The present invention provides a mechanism for integrating a PIM application with a presence system, so as to allow one user to be notified of changes in PIM information of another user or group of users.

In one exemplary embodiment of the invention, a presence server maintains presence records for one or more users, and a PIM application runs on a client station or a server to maintain PIM information for one or more users. Further, a presence client (e.g., user agent client) is tied to the PIM application and is thereby aware of changes that are made to the PIM information in the PIM application.

The presence server may send a subscription message to the presence client, requesting to be alerted whenever a change occurs to a given user's PIM information (or to the PIM information of any users in a given group). In response, whenever a change occurs to the status of the given user's PIM information, the presence client will send a first notification message to the presence server, alerting the presence server of the change in status.

Further, the presence server may receive a subscription message from another user, requesting to be alerted whenever change occurs to the given user's PIM information. Thus, when a presence server receives the first notification message indicating that a change has occurred in the status of a given user's PIM information, the presence server may then send a second notification message to the other user, alerting the other user of the change.

By integrating PIM information and a presence system in this manner, it becomes possible to automatically alert a user when a change occurs in another user's PIM information, such as calendaring information. By way of example, user A might have a calendar of events recorded in the PIM application, and user B might subscribe to the presence server to be notified when a change occurs in user's A calendar. When the change occurs, the presence client tied to the PIM application would notify the presence server of the change, and the presence server would in turn notify user B of the change.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview

Figure 1:
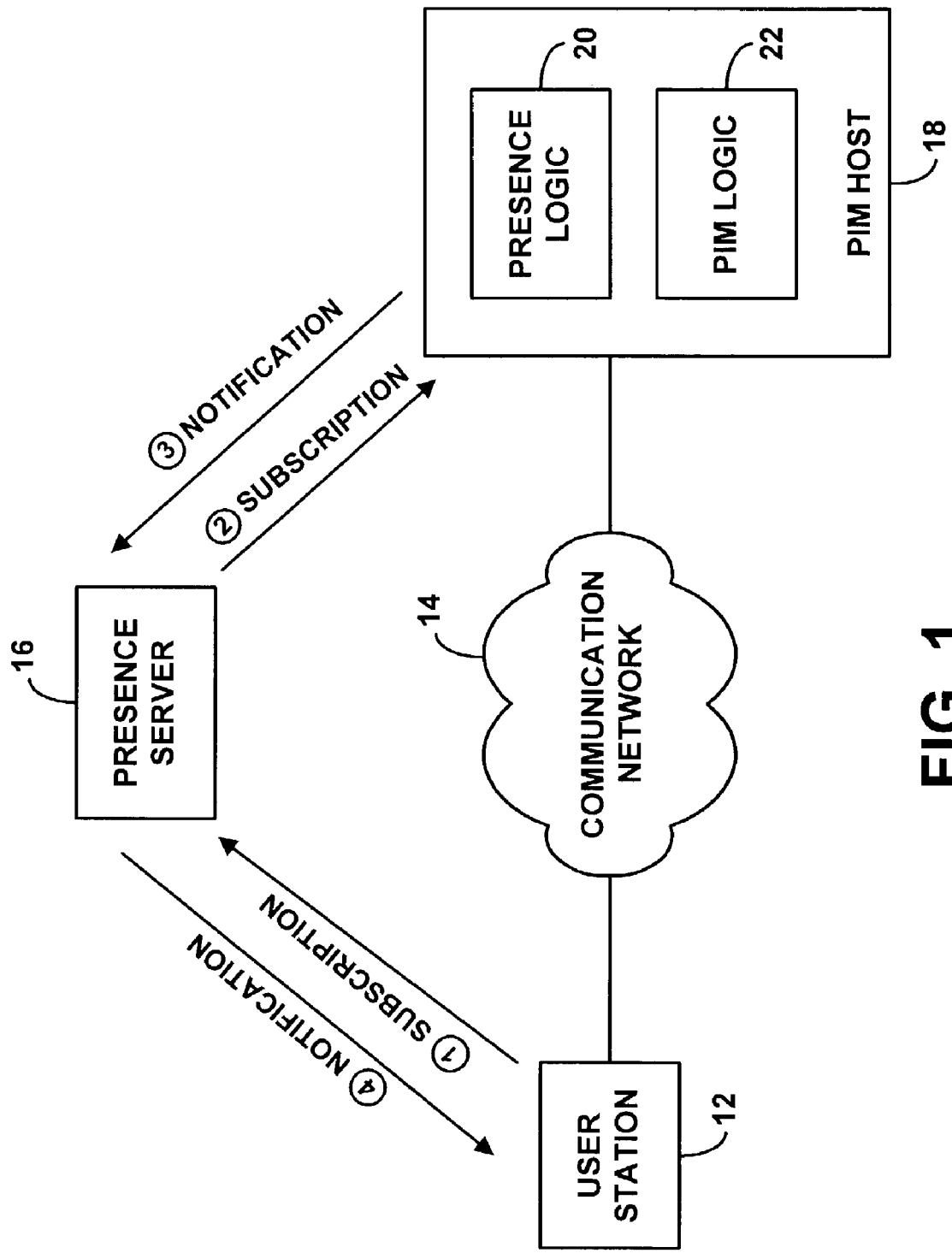
FIG. 1 is a block diagram of a system that can operate in accordance with the exemplary embodiment.

Referring to the drawings, FIG. 1 is a simplified block diagram of a system that can operate in accordance with an exemplary embodiment of the present invention. As shown in FIG. 1, the system includes a user station 12, a presence server 16 and a PIM host 18, all coupled via suitable links to a communication network 14. Further, FIG. 1 depicts PIM host 18 comprising presence logic 20 and PIM logic 22. Of course, other entities might reside on or be accessible via communication network 14 as well.

Communication network 14, as generally depicted in FIG. 1, may represent a single network of a particular type, such as a packet-switched IP network, or a combination of networks interconnected together via appropriate interfaces and/or various network entities. Further, signaling messages exchanged between network entities shown in FIG. 1 will be presence subscription and notification messages, the format of which may depend on a particular type of protocols used for communication over network 14.

In an exemplary embodiment, a user operating user station 12 may wish to be notified of changes/updates in PIM information of another user or a group of users on communication network 14. Accordingly, the user may invoke an operation on user station, such as selecting another user's name from a display menu, to trigger user station 12 to send a subscription message to presence server 16. The subscription message may serve as a request for presence server 16 to subscribe to a status of PIM data of another user and to send notifications to user station 12 whenever a change occurs with respect to the PIM data of another user.

Presence server 16 may comprise a programmed computer and a database for collecting presence information by means of sending subscription messages to selected users, and distributing presence information by sending notification messages to selected users. As such, presence server could literally be a "server" class computer or it could be a client station or other entity that functions as a presence server.

Upon receipt of the subscription message from user station 12, presence server 16 may send subscription message to PIM host 18. PIM host 18 could be a server station running a PIM application and maintaining a database of PIM information for a group of users. Alternatively, PIM host 18 might be simply a client station (e.g., a user station) running a PIM application and storing PIM information for a particular user.

PIM host 18 further preferably comprises logic elements (e.g., software, hardware and/or firmware) such as presence logic 20 and PIM logic 22. Presence logic 20 may implement a user agent presence application that can receive subscriptions from the presence server and can respond with notifications when a change in state occurs. PIM logic 22, in turn, may hold user PIM information such as calendar information (e.g., scheduling information), contact information (e.g., buddy list, contact addresses, phone numbers, etc.) and task information (e.g., to-do list items, etc.)

Presence logic 20 and PIM logic 22 could be functionally tied together in various ways, so that presence logic 20 could learn when a designated change in PIM data occurs. For instance, when presence logic 20 receives a subscription to be notified of a particular change in PIM data, it could set one or more flags with respect to the PIM data (such as generally for PIM data of one or more PIM users, or for particular PIM data such as particular schedule or contact entries). When a change occurs with respect to that PIM data, PIM logic could detect that the flag was set and could responsively call presence logic 20. Other arrangements are possible as well. For instance, presence logic 20 could periodically poll PIM logic 22, or PIM logic 22 could periodically report changes to presence logic 20.

Further, although FIG. 1 shows presence logic 20 and PIM logic 22 as two distinct modules, it is possible that the two could be functionally integrated in a single logic module (e.g., as functions in a single program application.) For instance, a PIM application could integrally include presence logic, so as to facilitate receiving subscriptions and then sending notifications when changes occur in PIM data. Additionally, other logic could exist to coordinate the functions of presence logic 20 and PIM logic 22. The coordinating module could be arranged to detect when a change in PIM data occurs (e.g., PIM logic 22 could notify the coordinating module) and to responsively invoke presence logic 20.

Figure 2:
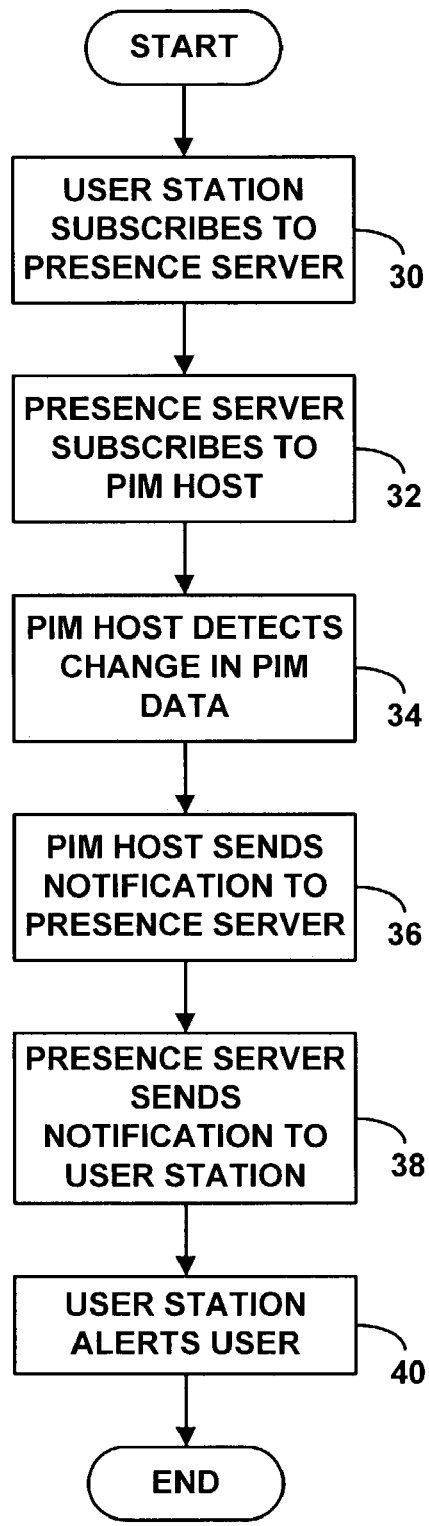
FIG. 2 is a flow chart depicting a set of functions that can be carried out in accordance with the exemplary embodiment.

FIG. 2 is a flow chart depicting a set of functions that could be carried out in accordance with the exemplary embodiment, in the arrangement shown in FIG. 1 for instance. Note that the order and division of steps in FIG. 2 is not intended to be restrictive, and many variations are possible.

As shown in FIG. 2, at step 30, user station 12 sends a first subscription message to presence server 16 to be notified if and when a change occurs in PIM data of a specified user (or if and when a designated change occurs in PIM data). The request could seek notice of any change falling within a category (such as "any calendar change", "any contact change", "any change to task X" or "any calendar change occurring on date X"), or the request could more specifically seek notice of change to particular PIM data or of a particular change in PIM data (such as any change to a particular calendar entry, a particular contact entry, a particular task entry, or such as a particular sort of change such as a cancellation/deletion).

At step 32, upon receipt of the first subscription message, presence server 16 responsively sends a second subscription message to PIM host 18. Further, presence server 16 preferably stores a record of the first subscription and the second subscription, so that, when it receives a first notification in response to the second subscription it can correlate it with the first subscription and responsively send a second notification to the user station.

At step 34, PIM host 18 thereafter detects the designated change in PIM data. And, at step 36, the PIM host responsively sends a first notification to the presence server 16, alerting the presence server of the change in PIM data. In response, at step 38, presence server 16 sends a second notification message to user station 12, alerting the user station of the change in PIM data. And, at step 40, user station 12 responsively alerts a user of the change, such as by presenting an audible alert through a loudspeaker or by presenting a pop-up message on a display screen, for instance.

In the exemplary embodiment, the first subscription and/or second subscription could have an expiration time, after which the subscription is no longer in effect. The expiration time could be set in advance, such as in the subscription message that user station 12 sends to presence server 16, or it could be a default expiration time applicable in all instances unless otherwise specified. Further, a given subscription could be deemed to expire after a predefined period of inactivity (such as a period set in advance by an administrator) or in response to user input or some other triggering event.

2. Exemplary Architecture

While FIG. 1 depicts a generalized arrangement of entities operating in accordance with an exemplary embodiment of the present invention, various details are possible. For purpose of example, FIG. 3 illustrates in more detail a block diagram of a communication system 50 in which an exemplary embodiment of the present invention can be employed.

This example arrangement assumes that the PIM host functions as a PIM server, such as Microsoft Exchange Server for instance. However, as noted above, it is equally possible that the PIM host could function as a PIM client, such as Microsoft Outlook on a client station for instance.

More generally, it should be understood that this and other arrangements and processes described herein are set forth for purposes of example only, other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and various functions could be carried out by software, firmware and/or hardware logic.

Figure 3:
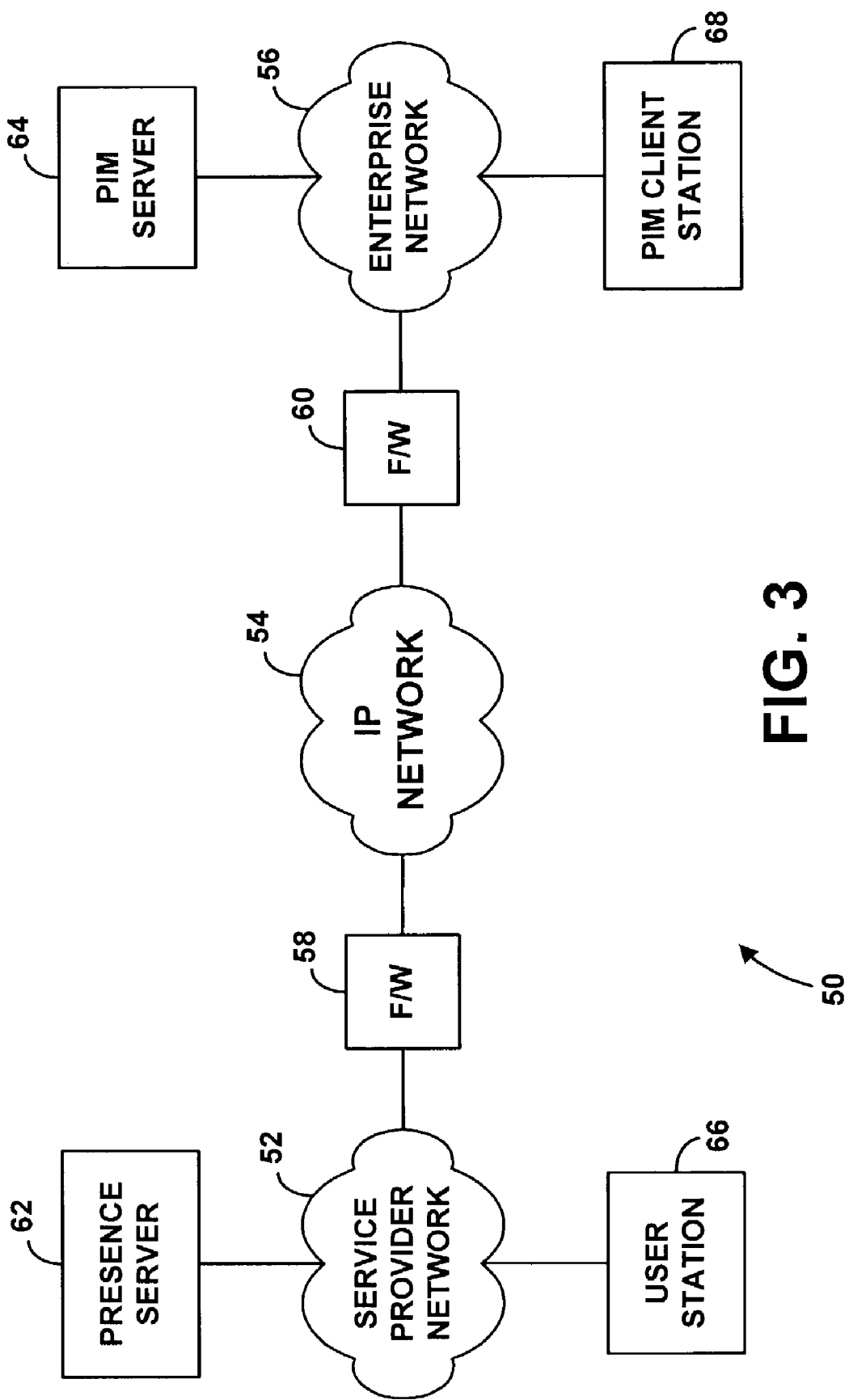
FIG. 3 is a block diagram depicting in more detail a communication system in which the exemplary embodiment can be employed.

As depicted in FIG. 3, the exemplary telecommunications system 50 includes a service provider network 52, a public packet network 54 and an enterprise network 56, which can be coupled together by firewalls 58, 60. Sitting on the service provider network is a presence server 62, and sitting on the enterprise network is a PIM server 64. Further, sitting on the service provider network is a user station 66, and sitting on the enterprise network is a PIM client station 68.

Generally speaking, with this arrangement, a PIM user may operate the PIM client station 68 to manage the user's PIM data on PIM server, such as to create new PIM data or change or modify existing PIM data. And a user operating user station 66 may subscribe to presence server 62 to be notified when the PIM user's PIM data changes. In response, presence server 62 could then subscribe to the PIM server 64 to be notified when the change occurs. When the change occurs, the PIM server 64 may could notify the presence server 62, and the presence server 62 could responsively notify the user station 66. The user station may then alert a user of the change in PIM data.

In this regard, any of a variety of messaging protocols could be used to facilitate presence communication among entities of system 50, as long as the communicating entities are programmed to communicate accordingly. In the exemplary embodiment, for instance, the entities can be programmed to engage in presence communication according to the well known "Session Initiation Protocol" (SIP), defined by Internet Engineering Task Force (IETF) Request for Comments (RFC) 3261, dated June 2002, which is hereby incorporated by reference.

SIP is a text-based signaling protocol that was created for use in setting up and controlling packet data sessions (e.g., multimedia sessions) between two or more entities. SIP messages can be carried over packet-switched networks such as those shown in FIG. 3 and/or over other sorts of networks.

As is well known in the art, each entity that engages in SIP communication is considered a "SIP user" and will typically have a "SIP address," which may take the form username@realm. In practice, the SIP user will send (or cause to be sent) a SIP "REGISTER" message to a SIP registration server, advising the server of the network address where the SIP user is currently located. That way, when another user sends a SIP message to the SIP address of the SIP user, the registration server can direct the message to the current network address of the SIP user.

Further, SIP has been extended to support presence communications. In this regard, the industry has embraced a protocol referred to as "SIMPLE" (SIP for Instant Messaging and Presence Leveraging Extensions), as defined by one or more internet drafts well known in the art. SIMPLE defines a SIP "SUBSCRIBE" and "NOTIFY" messages, which can be used to facilitate presence communication. The SUBSCRIBE message is a request to be notified about the state of a presentity, and the NOTIFY message is a reply that conveys the requested state information.

The networks shown in FIG. 3 could take various forms. For example, the service provider network 52 could comprise a packet-switched network that is owned and operated by a service provider as a transport and/or signaling network. User station 66 could then have a landline and/or wireless access path to the service provider network 52. For instance, the service provider could also operate a radio access network that enables user station 66 to connect with the service provider network through an air interface (e.g., CDMA, TDMA, GSM, 802.11x, etc.), a base station or access point, and a network access server. Or the service provider could operate a cable or DSL access system that allows user station 66 to connect accordingly.

The public packet network 54 may then be the Internet or another packet-switched network. And the enterprise network could be a private corporate LAN or other packet-switched network. Alternatively, the various networks shown in FIG. 3 could take other forms and could be combined together or distributed in various ways.

Figure 4:
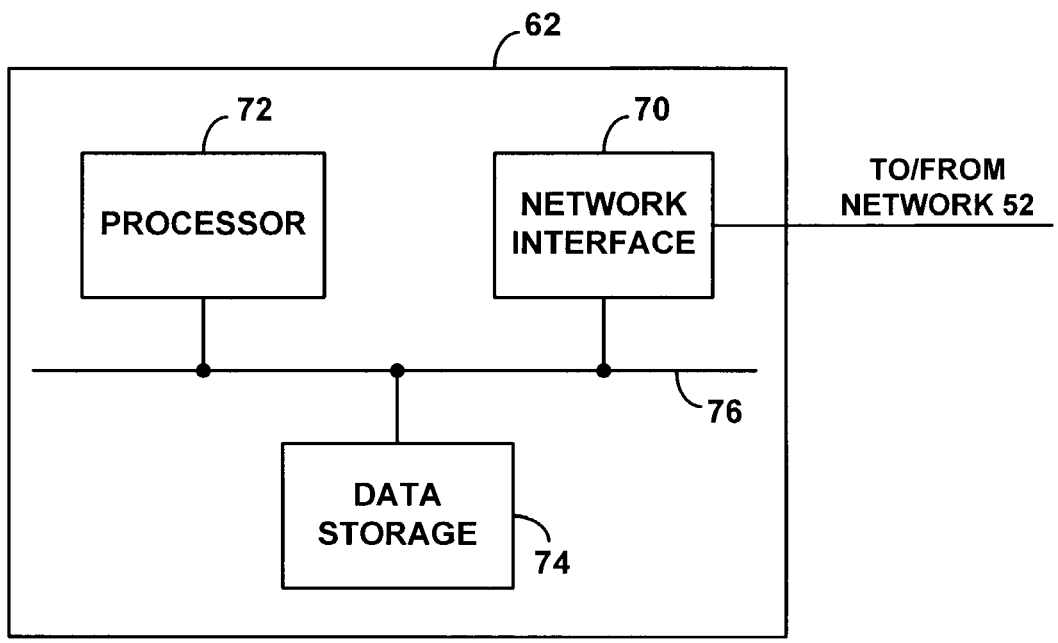
FIG. 4 is a block diagram of an exemplary presence server.

The presence server 62 is generally a server class computer or other entity that is capable of carrying out the functions described herein. As such, the presence server 62 can also take various forms. FIG. 4 is a generalized block diagram of a representative presence server 62, which depicts components including a network interface unit 70, a processor 72, and data storage 74, all tied together via a system bus or other mechanism 76.

Network interface unit 70 provides connectivity with service provider network 52. As such, network interface unit 70 may receive data from the network and may route data independently over the network to designated network addresses. Network interface unit 70 can vary in form, depending on the form of service provider network 52 and may, for instance, comprise an Ethernet network interface card.

Processor 72 may be one or more general purpose processors (such as Intel Pentium class processors or better) and/or dedicated processors (such as digital signal processors), and data storage 74 may be any sort of storage, whether volatile and/or nonvolatile. Data storage 74 preferably holds a set of instructions executable by processor 72 for carrying out various functions described herein, as well as reference data to which processor 72 could refer in carrying out the various functions.

For example, data storage 74 may include program instructions that processor 72 can execute to send and receive presence subscriptions and notifications and to store and refer to subscription information so as to facilitate sending notifications upon learning of a change in PIM data. Such program instructions could define a SIP/SIMPLE user agent that can send and receive SUBSCRIBE and NOTIFY messages. Further, the data storage 74 would preferably maintain a record of subscription requests, so that when the presence server receives a NOTIFY indicating a change in PIM data, the presence server can responsively send a NOTIFY to a SIP user that subscribed to learn of that change.

More specifically, in executing the program instructions, processor 72 could receive a first SUBSCRIBE request from a user of user station 66, seeking to learn of a change in PIM data regarding another user or group of users (or regarding the requesting-user, for that matter). In response, processor 72 could authenticate, authorize and store the subscription and then send a second SUBSCRIBE request to PIM SERVER 64, seeking to be notified when the designated change in PIM data occurs. Thereafter, when the processor receives a first NOTIFY reply from the PIM server 66 indicating that the designated change has occurred, the processor may correlate the NOTIFY with the stored subscription and then responsively send a second NOTIFY to user station 66, alerting the requesting user of the change in PIM data.

Note that the presence server could interact with multiple users at multiple user stations, and the presence server could interact with multiple PIM servers. Thus, the presence server could receive subscriptions from multiple users seeking to learn of change in PIM data, and the presence server could respond to the subscriptions by subscribing to one or more PIM servers (or other PIM hosts). Upon receipt of as notification from a PIM server, the presence server could then match the notification to one or more subscriptions that it had received and could then send out one or more notifications accordingly.

Figure 5:
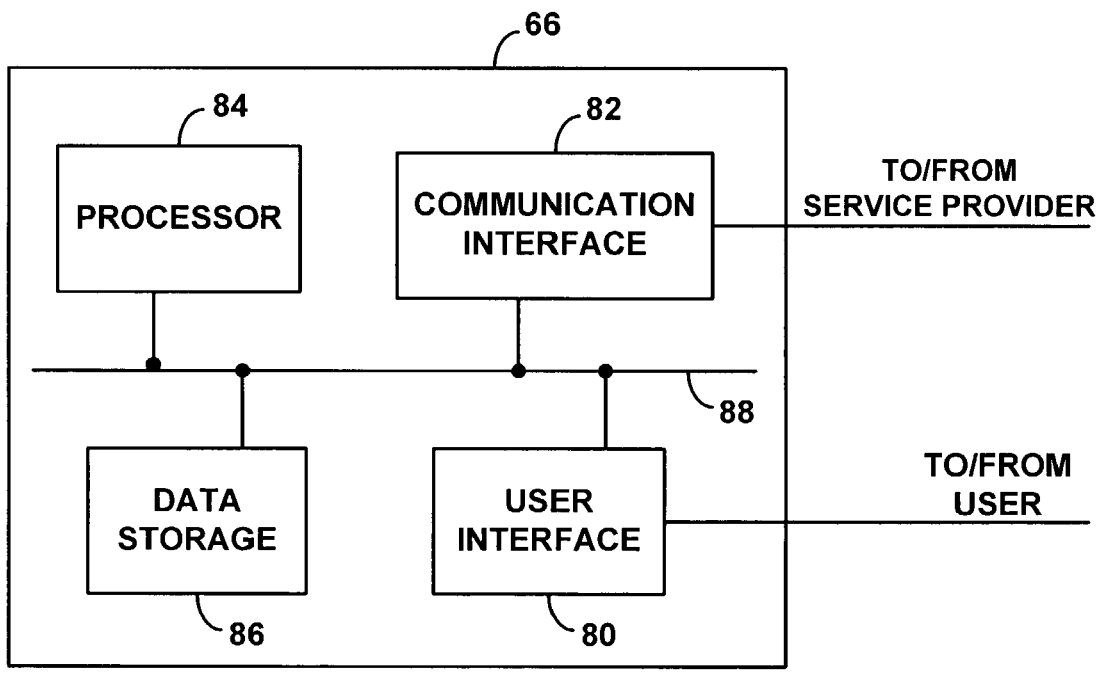
FIG. 5 is a block diagram an exemplary user station.

User station 66 may, in turn, also take various forms, examples of which include a landline or wireless desktop computer or handheld device such as a cellular wireless data terminal (e.g., cell phone, personal data assistant (PDA)), equipped with suitable means to interact with a user and to send and receive presence information related to PIM data. FIG. 5 is a generalized block diagram of a representative user station 66, depicting components such as a user interface 80, a communication interface 82, a processor 84 and data storage 86, all tied together via a system bus or other mechanism 88.

User interface 80 may provide means to facilitate interaction with a user, such as to receive from a user a request to be notified when PIM data changes, and to alert the requesting user upon learning of such a change. As such, the user interface might include input mechanisms such as a keyboard, keypad, microphone, mouse, and/or touch-sensitive display overlay, as well as output mechanisms such as a display and/or speaker.

Communication interface 82, in turn, may facilitate communication over a respective communication link with another network entity, for purposes of sending subscriptions and receiving notifications. The communication interface can take various forms. For example, if the user station is a wireless mobile station, the communication interface may include an antenna (not shown) for sending and receiving radio frequency signals over an air interface, as well as a chipset compliant with a suitable communication protocol (such as CDMA, TDMA, GSM or 802.11x, for instance). As another example, if user station is landline personal computer, the communication interface might comprise an Ethernet network interface card.

Processor 84 may be one or more general purpose processors (such as Intel Pentium class processors or better) and/or dedicated processors (such as digital signal processors), and data storage 86 may be any sort of storage, whether volatile and/or nonvolatile. For instance, data storage 86 may be flash memory and/or a storage drive.

Data storage 86 preferably holds a set of program instructions executable by processor 84 to carry out various functions described herein, as well as reference data to which processor 84 could refer in carrying out the various functions. For example, the program instructions may define a SIP/SIMPE user agent for receiving user subscription requests, responsively sending SUBSCRIBE messages to presence server 62, receiving NOTIFY messages from server 62, and presenting user alerts via user interface 80.

More particularly, the program instructions could define an application through which a user of the station might select the name of another and through which the user could request to be notified when a change occurs in the selected user's PIM data. The program application may then invoke a SIP user agent to send a SUBSCRIBE request to presence server 62. Further, when the SIP user agent receives a NOTIFY indicating a change in PIM data, the SIP user agent could pass that notification on to the application, which could then present an alert to the user of the station via user interface 80.

Figure 6:
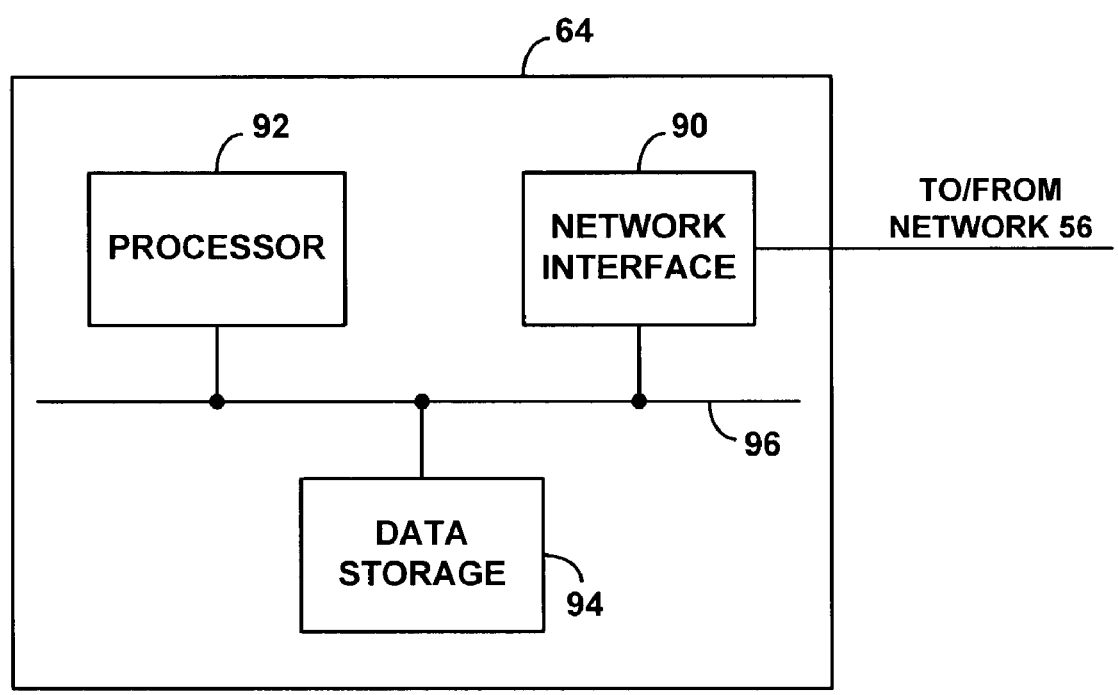
FIG. 6 is a block diagram an exemplary PIM server.

PIM server 64, in turn, may be an enterprise email server or some other entity that manages personal information such as schedule and contact information. FIG. 6 is a generalized block diagram of a representative PIM server 64, which includes a network interface unit 90, a processor 92, and data storage 94, all tied together via a system bus or other mechanism 96.

Network interface unit 90 provides connectivity with enterprise network 56. As such, network interface unit 90 may receive data from the network and may route data independently over the network to designated network addresses. Network interface unit 90 can vary in form, depending on the form of enterprise network 56. For instance, assuming enterprise network 64 is an IP network, the network interface unit can be an Ethernet network interface card.

Processor 92 may be one or more general purpose processors (such as Intel Pentium class processors or better) and/or dedicated processors (such as digital signal processors), and data storage 94 may be any sort of storage, whether volatile and/or nonvolatile.

In the exemplary embodiment, data storage 96 holds a set of program instructions executable by processor 92 to carry out various functions described herein, as well as reference data to which processor 92 could refer in carrying out the various functions. For example, the program instructions may define (i) a PIM application and (ii) a presence application. An example of a suitable PIM application is Microsoft Exchange Sever. And an example of a suitable presence application is a SIP/SIMPLE user agent client. Further, the program instructions may further define an application module that periodically polls the PIM application for changes in PIM data and reports the changes to the presence application, so that the presence application is aware of such changes. Those skilled in the art could write such program instructions.

Further, data storage 96 may hold PIM data for a plurality of users, such as a user of PIM client station 68. Alternatively, the PIM data could reside in an external database, and PIM server 64 could access the data in the database, thus effectively still maintaining the data.

PIM client station 68 could then also take various forms. For instance, it could be a landline or wireless desktop computer or handheld device. Preferably, the PIM client station will run a PIM client application, such as Microsoft Outlook for instance, which conventionally interacts with the PIM application on PIM server 64. In this way, a user of the PIM client station could manage (create, modify and/or delete) PIM data maintained by PIM server.

Note that, although PIM client station 68 is shown as a node on enterprise network 56, it could just as well be located elsewhere and could still interact with PIM server 64. For example, PIM client station 68 could be another user station on service provider network 52 and could gain access to enterprise network 56 through a virtual private network 56 or in some other fashion. Numerous other variations from the arrangement shown in FIG. 3 are possible as well.

3. Exemplary Operation

As noted above, with the arrangement of FIG. 3, a user of user station 66 can subscribe to be notified when PIM data changes in PIM server 64.

By way of example, assume user A is operating user station 66 and user B is operating PIM client station 68, and assume further that PIM server 64 maintains user B's PIM data, such as schedule and contact information for instance. Users A and B might be in a common enterprise group, and presence server 62 may maintain group data reflecting that user A has the right to learn about changes in user B's PIM data.

Through interaction with an application running on user station 66, user A might then request to be notified when a change occurs to user B's schedule, such as a change to a particular appointment, designated in PIM server 64 by a unique appointment number. In response, the SIP/SIMPLE user agent on user station 66 may then send to the presence server 62 (or to a SIP proxy server that could then forward to presence server) a SIP SUBSCRIBE message, seeking to be notified when the designated change occurs in user B's schedule. The SUBSCRIBE message might thus indicate that the event at issue, and it might designate user A as the requesting user.

Upon receipt of the SUBSCRIBE message, the presence server 62 may then determine by reference to its group data that the requesting user A is authorized to learn about the designated change in user B's schedule. The presence server 62 may then store the SUBSCRIBE, or another indication of the subscribe, in data storage 74. And the presence server 62 may itself send a SUBSCRIBE message via networks 52, 54 and 56 to PIM server 64, seeking to be notified of that change.

Upon receipt of the SUBSCRIBE message from presence server 62, the presence application on PIM server 64 will store the SUBSCRIBE or an indication of the subscribe, in data storage 86. For instance, as noted above, the presence application could set a flag with respect to the designated PIM user and/or PIM data, indicating that a subscription exists with regard to that user or data.

Further, PIM server 64 could be arranged to seek authorization from the user who is the subject of the SUBSCRIBE request, before responding. For instance, upon receipt of the SUBSCRIBE message from presence server 62, PIM server 64 could note that request seeks to learn of a change in user B's PIM data. And PIM server 64 could responsively send an instant message or other prompt to PIM client station 68, seeking user B's approval and could await response from user B.

If user B approves the request, then the PIM server could send a SIP "202 ACCEPTED" response to the presence server, and the presence server could then similarly send a 200 ACCEPTED message to user station 66. On the other hand, if user B rejects the request, then the PIM server could send a SIP "481 REJECTED" response to the presence server, which would in turn cause the presence server to reject the request from user A.

At some point thereafter (assuming user B approved the request, if necessary), user B may operate PIM client station 68 to make the designated change in user B's schedule on PIM server 64. (Alternatively, a change to the PIM data could occur in some other way.) When that happens (or at a next periodic interval), the PIM application or a coordinating application module on PIM server 64 may call the presence application. And the presence application may respond to the change by sending a NOTIFY message to presence server 62, indicating that the change has occurred.

Preferably immediately upon receipt of that NOTIFY message (but alternatively at some periodic interval), the presence server 62 will then itself send a NOTIFY message to the user station (effectively to user A), indicating that the change has occurred. And the user station 66 will then present an alert to user A, indicating that the change occurred. As noted above, for instance, the user station could display a pop-up window or audible alert indicating that the change has occurred.

4. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A system for reporting changes that occur in a personal information management (PIM) data maintained by a PIM host, wherein the PIM host includes PIM logic for managing the PIM data, the system comprising:
   presence logic tied to the PIM logic;
   a presence server;
   the PIM host being arranged (i) to maintain the PIM data of at least one user, (ii) to receive a subscription request from the presence server, the request seeking permission to notify at least one designated entity when a change occurs in the PIM data of a specified user, (iii) in response to the subscription request, to send a permission request to the specified user requesting permission to notify the presence server when a change occurs in the designated user's PIM data, (iv) to receive a response from the specified user providing permission to notify the presence server when a change occurs in the specified user's PIM data, and (v) to send a first notification to the presence server only if the PIM host has received the permission response from the specified user, the first notification indicating that the change occurred;
   the presence server being arranged to respond to the first notification by sending a second notification to the at least one designated entity, the second notification indicating that the change occurred.

2. The system of claim 1, wherein the PIM host comprises a network server running a PIM application.

3. The system of claim 1, wherein the PIM host comprises a client station running a PIM application.

4. The system of claim 3, wherein the client station is a cellular wireless terminal.

5. The system of claim 1, wherein the PIM data comprises calendar information, and wherein the change in PIM data comprises a change in the calendar information.

6. The system of claim 5, wherein the calendar information comprises scheduling information maintained for a first user, and wherein the at least one designated entity comprises a second user.

7. The system of claim 1, wherein the PIM data comprises contact information, and wherein the change in PIM data comprises a change in the contact information.

8. The system of claim 7, wherein the contact information comprises contact information maintained for a first user, and wherein the at least one designated entity comprises a second user.

9. The system of claim 1, wherein the PIM data comprises task information, and wherein the change in PIM data comprises a change in the task information.

10. The system of claim 9, wherein the task information comprises task information maintained for a first user, and wherein the at least one designated entity comprises a second user.

11. The system of claim 1, wherein the presence server resides on a service provider network.

12. The system of claim 11, wherein the PIM host resides on an enterprise network separate from the service provider network.

13. A method for reporting changes in a personal information management (PIM) data of a specified user, wherein the PIM data is maintained by a PIM host, the method comprising:

the PIM host receiving a subscription from a presence server, the subscription seeking to notify at least one designated entity when a change occurs in the PIM data of the specified user, the PIM host responsively sending a permission request to the specified user, seeking permission to notify the presence server when a change occurs in the PIM data;

when a change occurs in the PIM data of the specified user, the PIM host sending a first signaling message to the presence server only if the PIM host has received permission from the specified user; and the presence server responding to the first signaling message, by sending a second signaling message to a designated entity, to notify the designated entity of the change in the specified user's PIM data.

14. The method of claim 13, further comprising:
tying presence logic to the PIM application, wherein sending a first signaling message to the presence server comprises the presence logic sending a first notification message to the presence server.

15. The method of claim 14, wherein the first notification message comprises a Session Initiation Protocol (SIP) "NOTIFY" message.

16. The method of claim 13, wherein the designated entity comprises a user station.

17. The method of claim 13, wherein the second notification message comprises a Session Initiation Protocol (SIP) "NOTIFY" message.

18. The method of claim 13, wherein the change in PIM data comprises a change in information selected from the group consisting of (i) calendar information, (ii) contact information and (iii) task information.

19. A method comprising, in order:

a presence server receiving from a first user a first subscription, seeking to be notified when a change occurs in personal information management (PIM) data of a second user, the second user's PIM data being maintained by a PIM host;

the presence server responsively sending to the PIM host a second subscription, seeking to be notified when the change occurs in the PIM data of the second user;

the PIM host responsively sending a request to the second user requesting permission to notify the presence server when a change occurs in the second user's PIM data;

the second user sending a response to the PIM host providing permission to notify the presence server when a change occurs in the second user's PIM data;

the PIM host sending to the presence server a first notification indicating that the change has occurred in the PIM data only if the PIM host has received the permission response from the second user; and the presence server responsively sending to the first user a second notification indicating that the change has occurred in the second user's PIM data.

20. The method of claim 19, further comprising:
storing an indication of the first subscription; and
upon receipt of the first notification, correlating the first notification with the first subscription so as to determine that the second notification should be sent to the first user.

21. The method of claim 19, further comprising:
receiving from a second user a third subscription, seeking to be notified when the change occurs in the PIM data; and
after receiving the first notification from the PIM host, responsively sending to the second user a third notification indicating that the change has occurred in the PIM data.

22. The method of claim 21, further comprising:
storing an indication of the first subscription;
storing an indication of the third subscription; and
upon receipt of the first notification, (i) correlating the first notification with the first subscription so as to determine that the second notification should be sent to the first user and (ii) correlating the first notification with the third subscription so as to determine that the third notification should be sent to the second user.

23. The method of claim 19, further comprising:
performing the method at a presence server on a service provider network.

24. The method of claim 23, wherein the PIM host resides on an enterprise network separate from the service provider network.

25. The method of claim 19, wherein the PIM data comprises calendar information, and wherein the change in PIM data comprises a change in the calendar information.

26. The method of claim 25, wherein the calendar information comprises calendar information maintained for a second user.

27. The method of claim 19, wherein the set of PIM data comprises contact information, and wherein the change in PIM data comprises a change in the contact information.

28. The method of claim 27, wherein the contact information comprises contact information maintained for a second user.

29. The method of claim 19, wherein the set of PIM data comprises task information, and wherein the change in PIM data comprises a change in the task information.

30. The method of claim 29, wherein the task information comprises task information maintained for a second user.

31. The method of claim 19, wherein the first user operates a first cellular wireless terminal, and wherein sending the second notification to the first user comprises sending the second notification to the first user over a communication path comprising a wireless air interface.

* * * * *